US005467106A

United States Patent [19]
Salomon

[11] Patent Number: 5,467,106
[45] Date of Patent: Nov. 14, 1995

[54] RETRACTABLE FACE-UP LCD MONITOR WITH OFF-MONITOR POWER SUPPLY AND BACK-EMF BRAKING

[75] Inventor: Andreas H. Salomon, Claremont, Calif.

[73] Assignee: Hughes-Avicom International, Inc., Glendora, Calif.

[21] Appl. No.: 194,559

[22] Filed: Feb. 10, 1994

[51] Int. Cl.$^6$ ............................................. G09G 3/36
[52] U.S. Cl. ................................. 345/87; 345/905
[58] Field of Search .......................... 345/905, 87, 30, 345/55, 84; 312/7.2, 7.1

[56] References Cited

U.S. PATENT DOCUMENTS 5,096,271  3/1992  Portman ................................. 312/7.2
5,173,686  12/1992  Fujihara ................................. 345/87

FOREIGN PATENT DOCUMENTS 4118711  12/1992  Germany .
0007082  1/1990  Japan .

Primary Examiner—Curtis Kuntz
Assistant Examiner—Minsun Oh
Attorney, Agent, or Firm—Terje Gudmestad; W. K. Denson-Low

[57] ABSTRACT

A retractable LCD monitor for use in aircraft and the like is supplied with power from a power supply that is secured in a fixed off-monitor location on the monitor's housing. The power supply also provides power for a motor assembly that controls a pivoting of the monitor between open and retracted positions. This configuration allows for a compact monitor assembly that can be stowed screen up within a restricted space housing, thus protecting the display from damage by passengers and presenting a pleasing appearance, while still pivoting the monitor by more than 90° to its open position. The motor that is used to pivot the monitor to the open position remains coupled to the monitor pivot mechanism during the retraction cycle, providing a back-emf that resists a spring force used to retract the monitor, and thereby cushion its retraction.

18 Claims, 6 Drawing Sheets

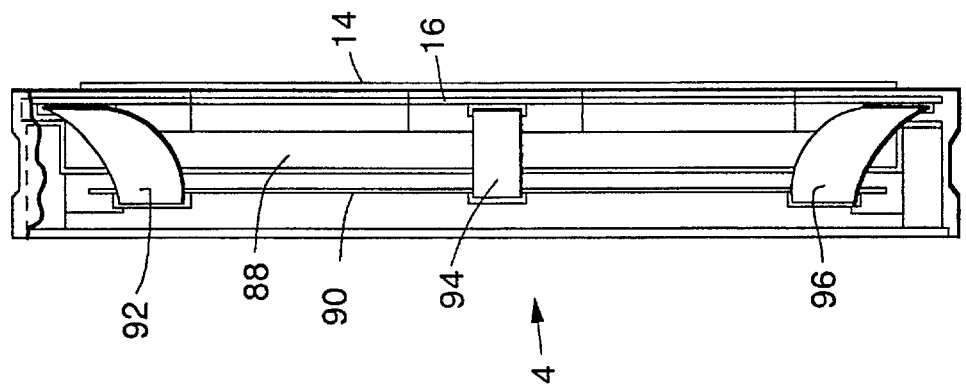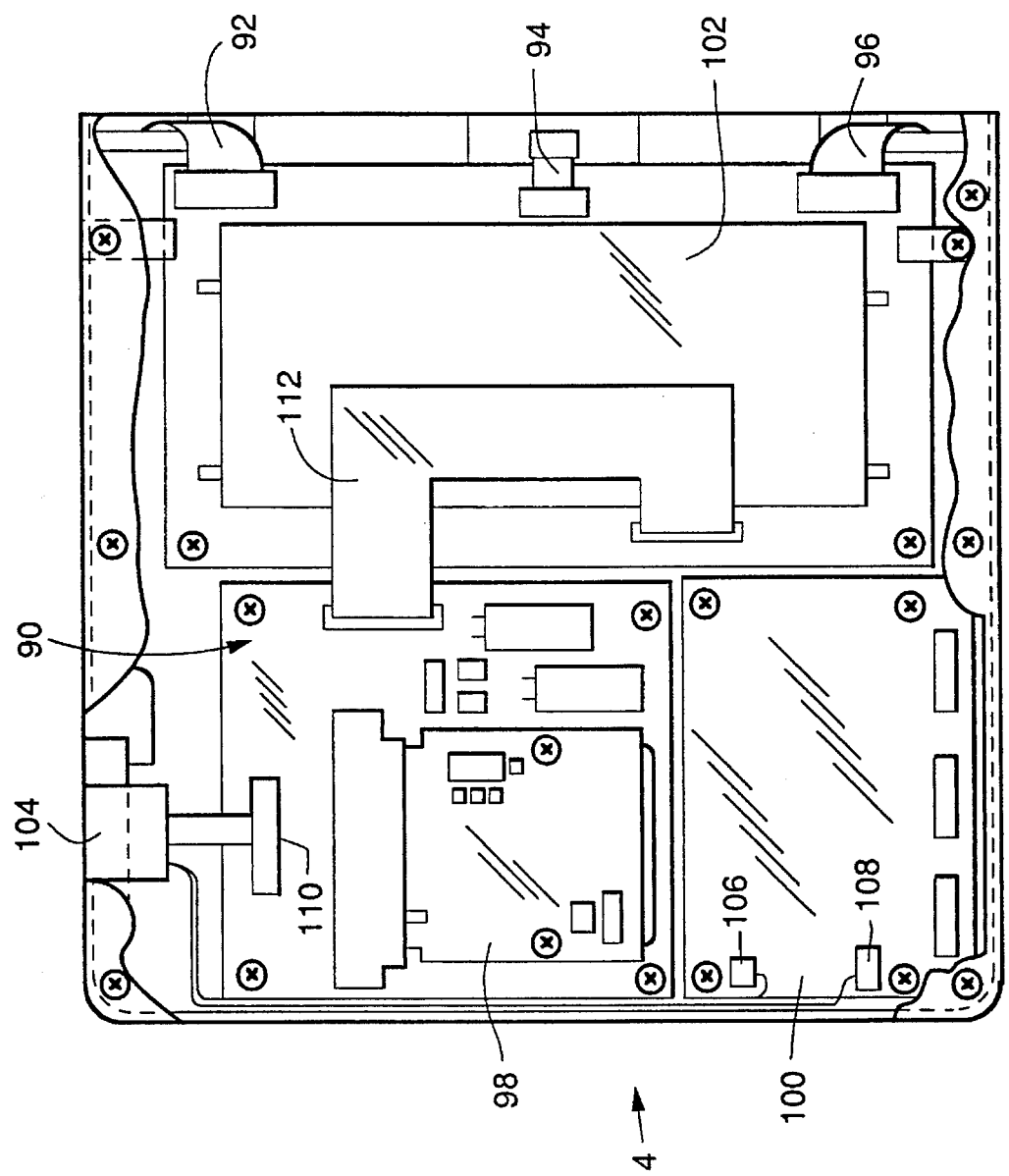

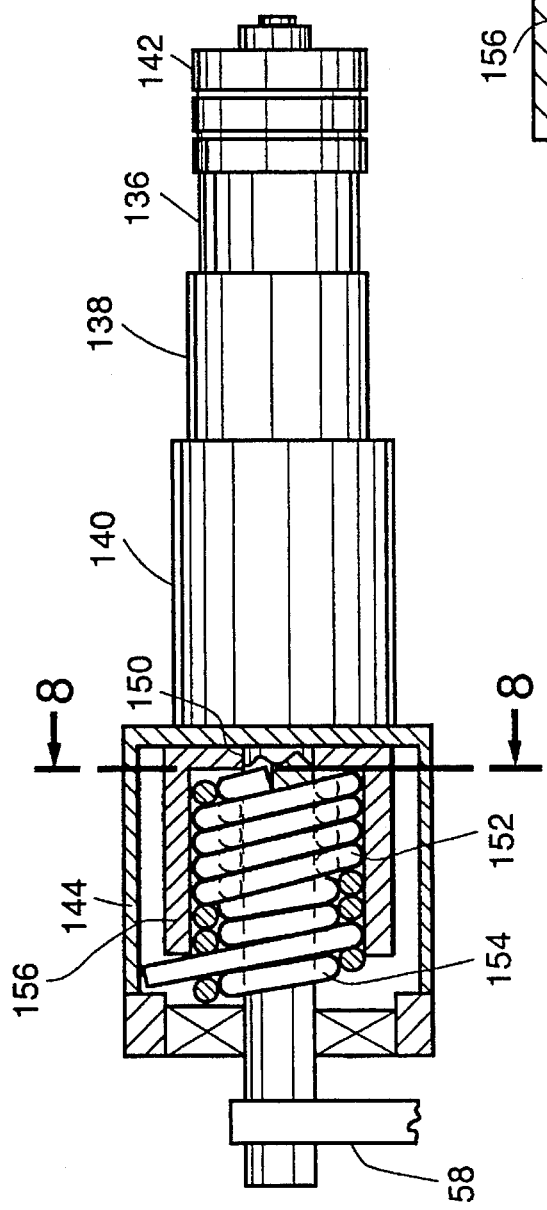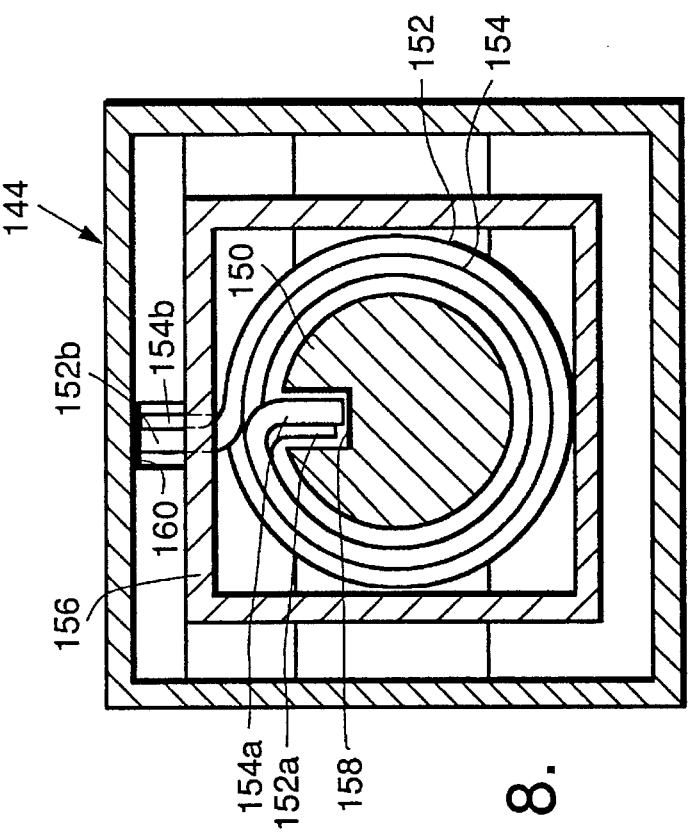
FIG. 7.
FIG. 8.

RETRACTABLE FACE-UP LCD MONITOR WITH OFF-MONITOR POWER SUPPLY AND BACK-EMF BRAKING

BACKGROUND OF THE INVENTION

1. Field of the Invention

This invention relates to retractable liquid crystal displays (LCDs), particularly of the type intended for overhead passenger use in commercial aircraft.

2. Description of the Related Art

LCD monitors for use in commercial aircraft and other vehicles pivot down from an overhead compartment when in use, and at other times are retracted and stowed in the overhead compartment above the passenger seats. One monitor is typically provided for each three rows of seats.

The monitors are typically stored in the overhead compartments with their LCD screens facing down into the passenger area, where it is exposed for possible damage by passenger use. While it would be desirable to stow the monitors with their screens facing up into the interior of the overhead compartment, the monitor and its attendant circuitry and power supply are relatively bulky. This limits the angle through which the monitor can be rotated from the overhead compartment, whose space is quite limited in aircraft such as the Airbus A320. By storing the monitors with their screens facing down into the passenger area, only a limited rotation of less than 90° is necessary to orient the monitors to their viewing positions, in which their screens face down and towards the rear of the passenger area. Stowing the monitors with their screens face up would require a pivot of more than 90° to reach this viewing position. The limited space available in the overhead compartments cannot accommodate this much of a pivot with the relatively bulky monitors that are presently available.

SUMMARY OF THE INVENTION

This invention seeks to provide a compact, light weight retractable LCD monitor that is capable of being stowed screen up in a conventional aircraft overhead compartment, and of being pivoted more than 90° to a proper viewing position. Another object is to cushion the retraction of the monitor so that it closes softly into the overhead compartment, without endangering the LCD screen.

In the accomplishment of these goals, an LCD monitor is pivotally mounted to a housing that can be positioned in the overhead compartment of an aircraft or some other desired location, with a motor mounted to the housing so that it does not pivot with the monitor. A power supply for both the motor and the housing is likewise mounted to the housing so that it does not pivot with the monitor. The motor is mechanically coupled to the monitor to pivot it to an open position, with a spring mechanism used to return the monitor to a retracted position, and electrical connectors supplying the monitor with power from the power supply when it is open for viewing. The use of an off-monitor power supply for both the motor and the monitor reduces the bulk and weight of the monitor assembly, allowing it to be stowed screen up in small overhead compartments.

In a preferred embodiment, the motor causes the spring mechanism to flex and store potential energy when the motor pivots the monitor to its open position. The potential energy in the spring is used to retract the monitor when desired. The mechanical coupling between the motor and monitor causes the motor to operate as a generator during the retraction cycle, such that it resists and slows the monitor's retraction to provide for a cushioned closing. The motor is preferably a rotary electrical motor that develops a back-EMF to resist the retraction force.

The coupling mechanism is preferably a compound pivot linkage that allows the monitor to be pivoted more than 90° between its open and retracted positions. One end of the linkage is pivotally connected to a flange that extends from the LCD screen side of the monitor towards the motor; the monitor is pivotally mounted to the housing at a pivot location between the screen and the opposite side of the monitor.

The electronics that move with the monitor are restricted to those necessary to control the LCD. Other electronics, such as power connections for the motor and brake, are provided on a fixed circuit board within the housing. In its retracted position, the monitor screen faces up towards the underside of the fixed circuit board, while the opposite side of the monitor is flush with the exterior housing wall.

These and other features and advantages of the invention will be apparent to those skilled in the art from the followed detailed description, taken together with the accompanying drawings.

BRIEF DESCRIPTION OF THE DRAWINGS

FIG. 4 is a plan view of the opposite side of the monitor from its LCD screen, with the back cover removed;

FIG. 5 is a right side elevation view of the monitor;

FIG. 7 is an elevation view, partially sectioned, showing the drive mechanism for pivoting the monitor; and FIG. 8 is a enlarged sectional view taken along the line 8—8 of FIG. 7.

DETAILED DESCRIPTION OF THE INVENTION

Figure 1:
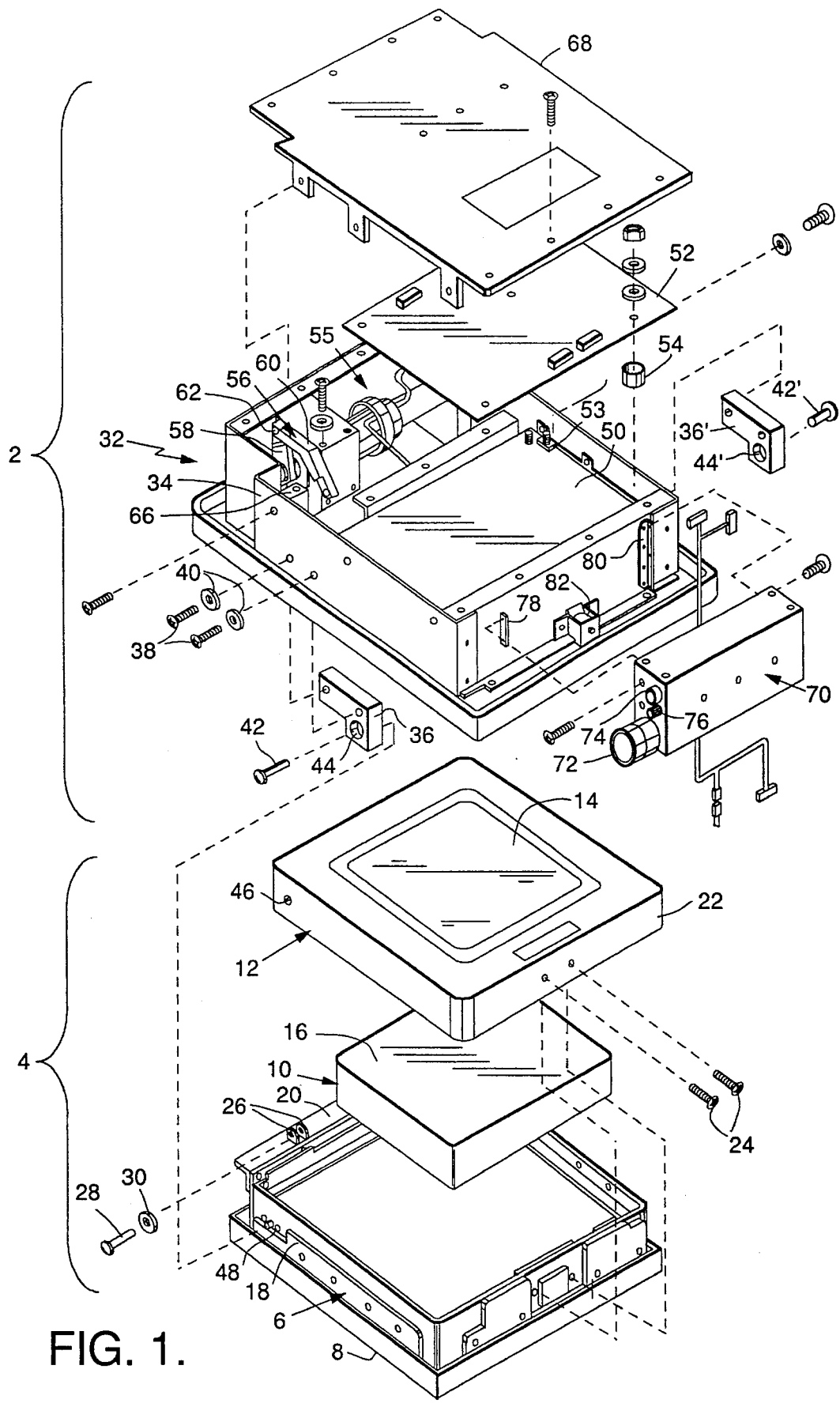
FIG. 1 is an exploded perspective view of the overall LCD assembly for a preferred embodiment of the invention.

FIG. 1 presents an exploded view of a retractable LCD monitor assembly that is particularly suited for commercial aircraft with a relatively small overhead compartment space, such as the Airbus A320. It includes a housing assembly 2 that fits into the overhead compartment, and a monitor assembly 4 that is stowed in a retracted position within the housing but can be pivoted out for viewing by the aircraft passengers.

The LCD monitor assembly includes a carriage 6 whose back surface 8 is exposed to the passenger area when the monitor is retracted to its stowed position, an LCD monitor 10, and a front cover 12 that includes a plastic screen 14 to protect the glass LCD screen 16.

An upstanding flange 18 is provided adjacent the periphery of carriage 6, with a lateral flange 20 extending out from one side of flange 18. A dependent peripheral flange 22 on the cover 12 is seated around the carriage flange 18 when the monitor is assembled, with the LCD 10 captured between its carriage and cover, and the assembly held together by screws 24 that are threaded into corresponding openings in the cover and carriage flanges 22 and 18.

A pair of upstanding arms or tabs 26 are provided towards one end of the lateral flange 20. As described below, these tabs provide a connection to the monitor assembly for receiving a pivot linkage that pivots the monitor between open and retracted positions. A cotter pin 28 extends through openings in the tabs to hold the linkage to the monitor assembly, with a mylar washer 30 inserted between the pinhead and tabs.

The housing assembly 2 includes a main housing 32, the underside of which is open to receive the monitor assembly. A lateral flange 34 extends around the main housing, with a pivot bracket 36 mounted to the inner surface of flange 34 by screws 38 and washers 40. A pivot pin 42 extends through aligned openings 44 in the pivot bracket, 46 in the LCD cover 12 and 48 in the carriage flange 18. The monitor assembly pivot openings 46 and 48 are positioned roughly 60% of the distance from the face of cover 12 to the rear surface of the carriage 6, and near the flange 20 side of the assembly. This location is suitable for pivoting the monitor assembly by more than 90° from a retracted position within the housing assembly to an open viewing position. A mirror image pivot bracket assembly is provided on the opposite side of the housing, the individual components of which are identified in FIG. 1 by the same reference numerals primed.

Figure 2:
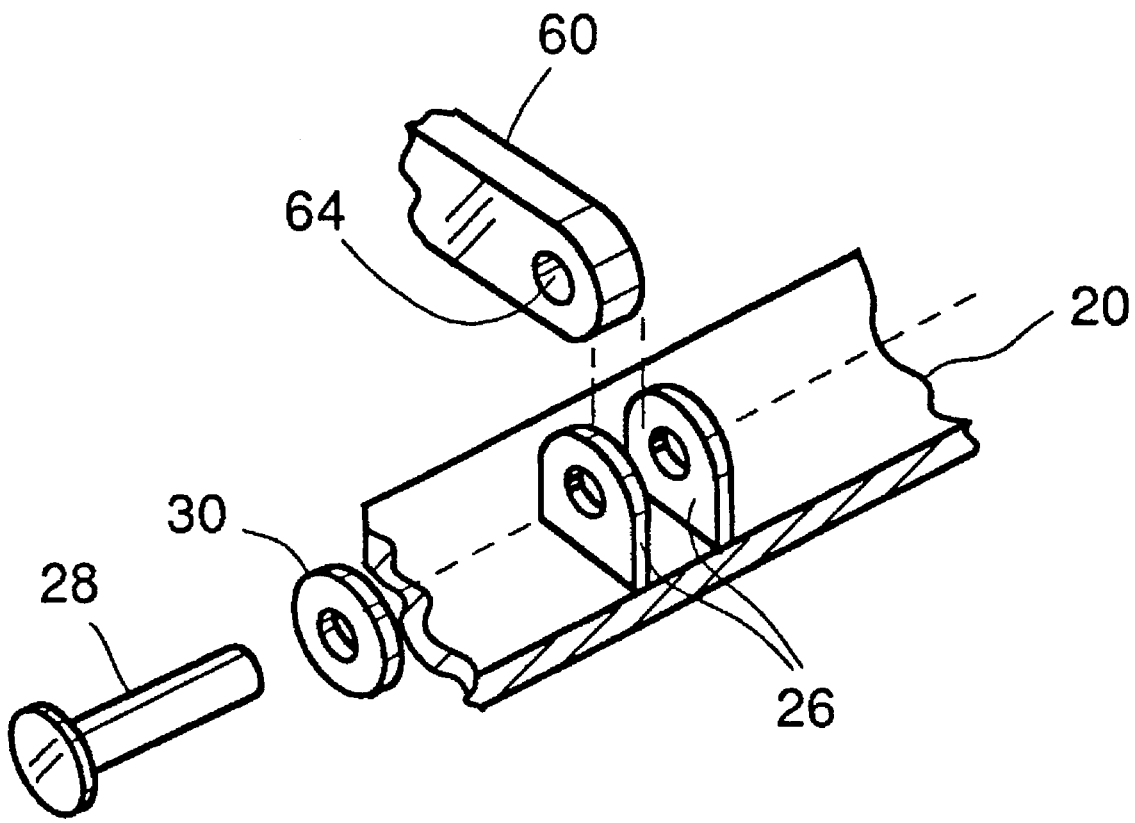
FIG. 2 is a fragmentary exploded view showing the coupling of the pivot linkage to the monitor assembly.

A recessed ceiling plate 50 is screwed in place over the housing opening that receives the monitor assembly. A printed wiring board 52 in turn is screwed in place over the ceiling plate 50, and separated therefrom by pads 53 and spacers 54. The printed wiring board 52 includes power and control circuitry for a motor/gear/brake assembly 55 that is located within the main housing 32, lateral to the housing's monitor receiving area. The motor/gear/brake assembly 55 controls the movement of a compound pivot arm linkage 56 that controls the pivoting of the monitor. The pivot linkage 56 includes two pivot links 58 and 60 that are pivotally connected to each other by a pivot pin 62. The opposite end of pivot link 58 from pin 62 rotates with a drive shaft from the motor/gear/brake assembly, while the opposite end of pivot link 60 has an opening 64 (shown in FIG. 2) that receives the pivot pin 28, thereby pivotally coupling the pivot linkage 56 with the monitor assembly. Also included in the same compartment with the motor/gear/brake assembly is a switch 66 that is actuated when the monitor is pivoted to its fully open position, deactivating power to the motor and activating power to the brake; the detailed operation of the motor/gear/brake assembly is described below. A cover 68 is screwed into place over the main housing.

One of the advantages of the invention is that a single power supply 70 provides power for both the motor/gear/brake assembly 55 that opens and retracts the monitor, and for the LCD within the monitor itself. The power supply package includes an input terminal 72 that receives power and control signals from a control station in the aircraft, a coaxial video input terminal 74 that receives an external video signal, typically from a video cassette recorded located in the front or rear of the aircraft, and a fuse holder 76. The power supply is mounted to flanges 78, 80 on the exterior of the main housing's lateral flange 34. In a particular embodiment, the power supply is a transformer and converts 115 volt, 400 Hz AC aircraft power to AC outputs at 34 and 24 volts. The transformer is connected to the monitor deployment control card 52, where rectifier, filter and regulator circuits convert the AC power outputs into DC outputs at +5, −9, +12 and +24 volts. The provision of a monitor power supply that is retained in the housing and does not pivot with the monitor allows for a significant reduction in the monitor assembly's bulk and weight. This makes it possible for the monitor to be stowed in its retracted position with its screen face up towards the interior of the housing, as shown in FIG. 1, while still leaving enough clearance within the housing to pivot the monitor by more than 90° so that its screen faces partially downward for viewing by the passengers. Also provided on the exterior of the main housing flange 34, immediately below the power supply 70, is a solenoid 82 for a latch (not shown) that provides a backup for the spring mechanism in holding the monitor in a retracted position.

Figure 3:
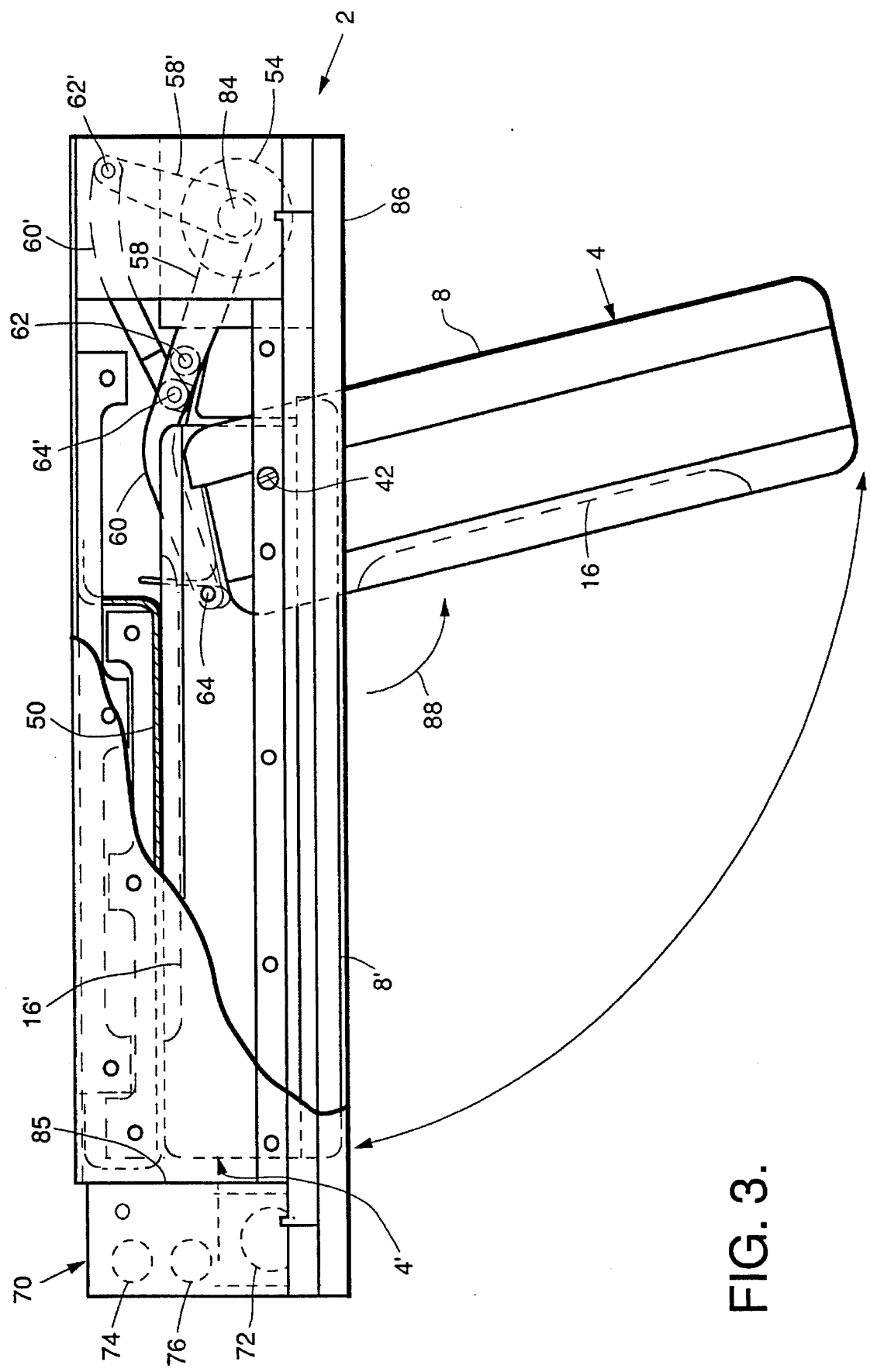
FIG. 3 is a partially broken away elevation view showing the monitor and both its open and retracted positions within the housing.

FIG. 3 shows the monitor in both its open and retracted positions; a prime is added to the reference numbers to indicate the retracted position. One end of the link 58 for the pivot linkage is coupled to the motor/gear/drive shaft 84 and rotates along with the drive shaft. Initially, with the monitor stowed in the housing, the inner link 58' is in a position of maximum clockwise rotation, and makes a significant angle with the outer link 60' at pivot pin 62'. In this position the LCD monitor 4' is retained in the housing, with its protective screen 16' facing up towards the ceiling plate 50 in the housing's monitor opening defined by the inner walls 85 of the housing flange 34. Furthermore, in this position the monitor's rear surface 8' is substantially flush with the housing's surrounding lower wall 86 that is exposed to the passenger compartment, thus presenting a smooth and pleasing appearance. With the compact monitor assembly provided by the invention, an LCD 16 with a display screen of approximately 22 cm can be provided with a thickness of only about 2.8 cm, such that the overall monitor 4 has a thickness of only about 5.4 cm. This degree of compactness allows the monitor and the attendant pivoting mechanism to be accommodated in a housing that is 7.9 cm thick, which is the maximum dimension permitted in certain aircraft.

To open the monitor to a viewing position, the motor/gear/assembly 55 rotates the drive shaft 84 counterclockwise. This in turn moves the linkage 58, 60 to the extended position shown, at which the monitor 4 has been pivoted counterclockwise by more than 90° in the direction indicated by arrow 88. Pivoting the monitor beyond a vertical orientation causes the screen 14 to face somewhat downward, allowing it to be easily viewed by passengers who are seated below the overhead compartment and behind the monitor.

Details of the monitor construction are shown in FIGS. 4 and 5. Starting from its viewing side, the monitor includes the plastic screen 14 that is bonded to the periphery of the cover 12 and protects the glass LCD screen 16, which includes the liquid crystals that form the display. A fluorescent backlight panel 88 is located behind and illuminates the LCD screen 16. The display is electrically controlled by circuitry on a printed circuit board 90 behind the backlight panel, with control signals provided on the circuit board to the LCD through flexible cables 92, 94, and 96. To maintain the compactness of the overall monitor assembly, the backlight panel 88 is preferably implemented about 0.63 cm thick.

The circuit board 90 includes a converter section 98 that converts between NTSC and PAL video formats, a power inverter 100 that transforms a 12 volt DC input from the power supply in the fixed housing to a higher voltage level for the backlight fluorescent tubes, and a control section 102 that receives +5 volt, −9 volt, +12 volt analog and digital ground and video signals for controlling the image on the LCD screen.

Video and power signals are provided to the monitor assembly through a receptacle 104, which provides a 12 volt DC signal to terminals 106, 108 on the power inverter board 100, and +12 volt, +5 volt, −9 volt, ground and video signals to a terminal strip 110 on the converter board 98. The input signals for the LCD control board 102 are provided from the converter board through a flexible cable 112. The circuit details of the various circuit board sections are conventional, and need not be described in detail.

Figure 6:
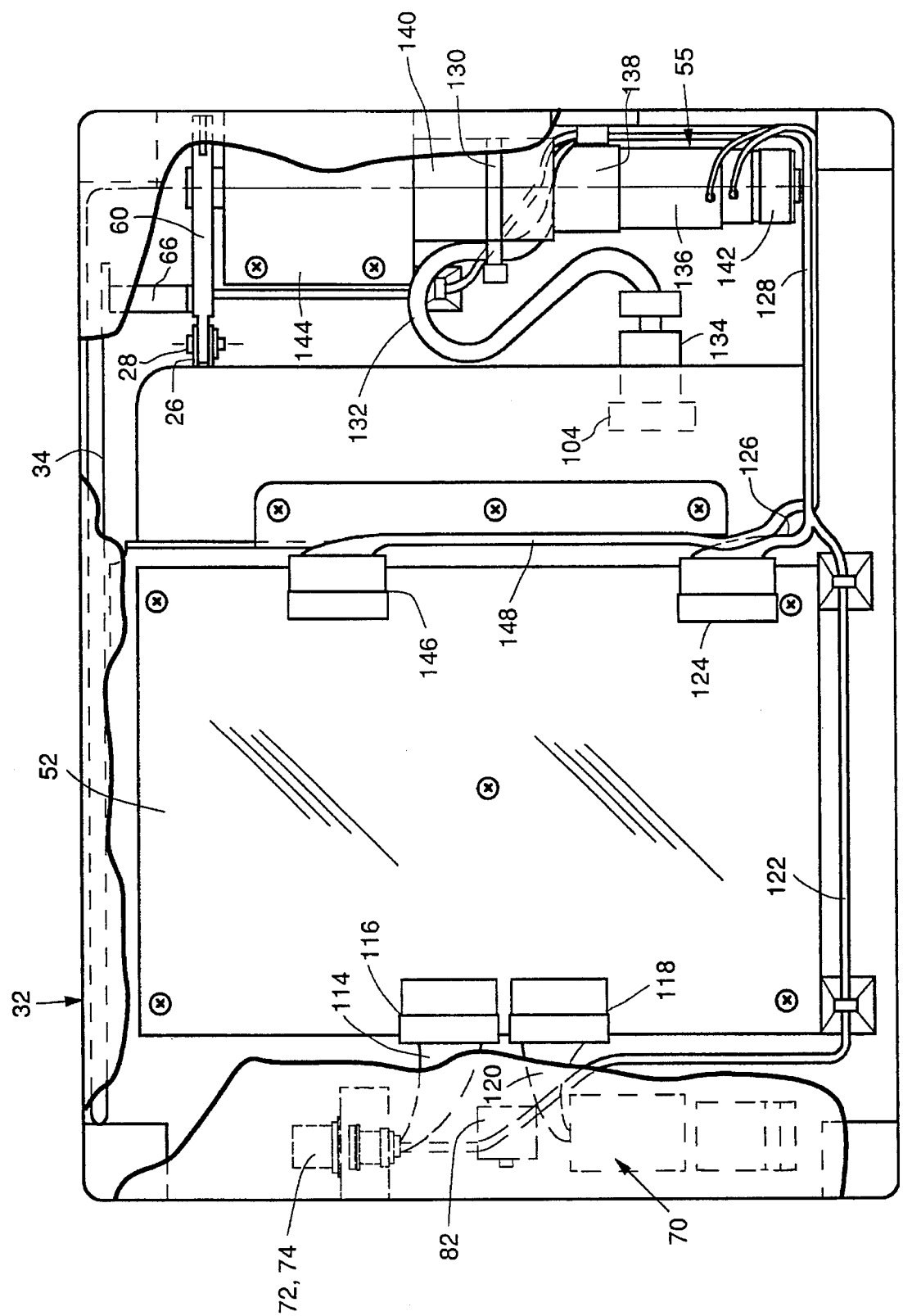
FIG. 6 is a simplified, partially broken away plan view of the fixed housing for the monitor assembly, showing its motor, power supply and electronics.

FIG. 6 gives a plan view of the fixed housing 2, with its cover 68 removed and with circuit details omitted. The power supply 70 includes an EMI filter, from which the aircraft 115 volt AC power is delivered from input terminal 72 through a connector flex cable 114 to a jack 116 on the circuit board 52. Jack 116 also accepts key line power on/off lines. From an adjacent output jack 118 on the circuit board, the 115 volt AC is delivered to the power supply through a flexible cable 120; the +12, +5, −9 volt, and analog and digital ground signals are also delivered back from the power supply to the circuit board through cable 120 and jack 118.

The input video signal at terminal 74 is supplied to a line 122, which is bundled with a DC power and control signal output from the circuit board through output jack 124 and line 126. The bundled line 128 is secured to the housing with a strap 130, with its remote end 132 connected to a plug 134 which mates with the receptacle 104 on the monitor assembly. The end 132 of the monitor's electrical supply line 128 has enough free play to allow the monitor to be pivoted to its fully open position without stretching the line.

The motor/gear/brake assembly 55 that is held in the housing 32 adjacent the circuit board 52 includes a rotary electric motor 136, a first stage gear box 138 driven by the motor, and a second stage gear box 140 that reduces the output from the first stage gearbox. The motor is preferably a 6,000 rpm device, with the first and second stage gearboxes comprising planetary gears that collectively step the rotational speed down to 3 rpm.

An electromagnetic brake 142 is actuated in response to position sensor switch 66 providing an appropriate signal to a microprocessor on the circuit board 52 when the monitor has reached a fully open position. When actuated, the brake 142 prevents the monitor from retracting back into the housing. The retraction force that acts to move the monitor back to a stowed position when the brake is released is provided by a torsion spring assembly 144, which is described below in connection with FIGS. 7 and 8. Power for the motor and brake is supplied from the circuit board 52 through an output jack 146 and electrical cable 148, which also supplies power and a signal path for the switch 66.

Further details of the monitor pivot mechanism are shown in FIGS. 7 and 8. An output drive shaft 150 from the second gearbox 140 is coupled into the spring housing 144. A pair of interwound torsion springs 152 and 154 are positioned within a cup 156 that rotates with the drive shaft 150. One end 152a, 154a of each spring near the bottom of the cup is bent and captured in a longitudinal groove 158 cut into the drive shaft. The opposite ends 152b, 154b of the springs extend out beyond the cup, and are captured in a longitudinal groove 160 in the interior wall of housing 144. The distal end of drive shaft 150 is coupled to the first pivot link 58, either by means of a connector pin or by providing the drive shaft and a corresponding opening in the link 58 with similar shapes, such as hexagonal or octagonal.

In operation, assuming that the LCD monitor is initially in a retracted position within the housing, a control signal applied to the unit through terminal 72 on the power supply causes the motor 136 to operate. This rotates the drive shaft 150 and the attached pivot link 58, driving the monitor assembly to pivot somewhat beyond 90° to the fully open position indicated by number 4 in FIG. 3. At this position the switch 66 is actuated and causes power to be applied to the brake 142 and removed from the motor 136. If desired, a manual power switch can also be provided as a backup to make sure that the motor power is turned off. The monitor's LCD then displays the video signal provided through input terminal 74.

Rotating the drive shaft to open the monitor winds springs 152 and 154, causing the springs to store additional potential energy that produces a rotational closing force on the drive shaft. This closing force is resisted, however, by the electromagnetic brake 142, which holds the monitor open. A separate mechanical latch (not shown), controlled by the solenoid 82, provides a backup for keeping the monitor open.

When the video program is over and it is desired to retract the monitor, power is removed from the brake allowing the springs to release potential energy by rotating the drive shaft in the opposite direction to pivot the monitor closed. To ensure a complete closing, a considerable spring force is employed. In the preferred embodiment, the torsion springs 152 and 154 are formed from 0.28 cm steel music wire, 270K yield, shot peened after forming, 3.6 cm long with a 0.37 cm pitch. The outside diameters of the inner and outer springs are 3.1 and 3.8 cm, respectively.

Without restraint, the spring force can produce a rapid closing of the monitor, possibly damaging it when it contacts the housing and producing a distracting noise for the passengers. A feature of the invention is that the monitor closing mechanism employs the same elements as those used to open it; the motor 136 and gear boxes 138, 140. The retraction of the monitor thus produces a counter rotation of the motor, through the intermediary gear boxes, that develops a back-emf in the motor. The springs are strong enough to fully retract the monitor, but their closing force is resisted by the motor's back-emf so that the retraction is slowed down and cushioned. The amount of back-emf that is generated is a function of the closing speed; as the spring tension is partially released during retraction cycle, the back-emf resistance is also reduced. The result is a self-regulated retraction force that changes by a lesser amount than the change in spring tension between the start and conclusion of the retraction cycle. The springs are pretensioned in their fully retracted positions to assure a residual closing force towards the end of the retraction cycle. The retractable LCD monitor is thus not only stowed screen up to protect the assembly and provide a pleasing appearance; the regulated retraction mechanism assures a complete closing while protecting against damage to the equipment or distracting noises that can be caused by closing the monitor too rapidly.

While a particular embodiment of the invention has been shown and described, numerous variations and alternate embodiments will occur to those skilled in the art. Accordingly, it is intended that the invention be limited only in terms of the appended claims.

I claim:

1. A retractable liquid crystal display (LCD), comprising:
   a housing having an exterior wall with an opening for an LCD monitor,
   an LCD monitor pivotally mounted to said housing for pivoting through an arc exceeding 90° between an open position at which the monitor extends out from the housing, and a retracted position at which the monitor is lodged in said opening, said monitor including an LCD viewing screen that is exposed for viewing in said open monitor position, faces the interior of said housing and is shielded by the remainder of said monitor in said retracted monitor position, said monitor being without an internal power supply but having an input to receive electrical power from an external supply, a motor mounted to said housing so that it does not pivot with said monitor, a power supply for said motor and for said monitor mounted to said housing outside the monitor's retracted position so that it does not pivot with said monitor, said power supply producing outputs at different respective voltage levels for said motor and said monitor, a mechanical coupling between said motor and said monitor for pivoting said monitor to its open position when actuated by said motor, a return actuator for returning said monitor to its retracted position, and an electrical connector for supplying said monitor with power from said power supply in its open position.

2. The retractable LCD of claim 1, said monitor including said LCD screen on one side and a back surface on an opposite side from said LCD screen, said back surface being substantially flush with said exterior housing wall with the monitor in its retracted position.

3. The retractable LCD of claim 1, said return actuator comprising a spring mechanism, wherein said motor is coupled to said spring mechanism to flex the spring mechanism and cause it to store potential energy when the motor pivots the monitor to its open position.

4. The retractable LCD of claim 3, wherein said mechanical coupling causes said motor to be operated as a generator during the retraction of said monitor, said motor resisting the retraction of said monitor and slowing its retraction rate.

5. The retractable LCD of claim 4, said motor comprising a rotary electrical motor that develops a back-emf (electromotive force) to slow the retraction of said monitor.

6. The retractable LCD of claim 1, said motor comprising a rotary electrical motor that is coupled to drive a rotating drive shaft, and said mechanical coupling comprising a compound pivot linkage connected between said drive shaft and said monitor.

7. The retractable LCD of claim 6, said monitor including said LCD screen on one side and a back surface on an opposite side from said LCD screen, said monitor being pivotally mounted to said housing at a pivot location between said screen and back sides, and including a flange that extends towards said motor from said screen side, with said pivot linkage coupled to said flange for pivoting the monitor about said pivot location.

8. The retractable LCD of claim 7, said flange including an upstanding receiver that pivotally receives said pivot linkage.

9. The retractable LCD of claim 1, said housing including an interior circuit board with control circuitry thereon, wherein the monitor's viewing screen is positioned facing said circuit board when the monitor is in its retracted position.

10. The retractable LCD of claim 1, further comprising an electromagnetic brake for retaining said monitor in its open position, said power supply being connected to supply power to said brake when it is desired to keep the monitor in its open position.

11. The retractable LCD of claim 1, wherein said motor is positioned within the housing lateral to said monitor in its retracted position, said monitor pivots out from the underside of the housing, and the housing includes an interior circuit board with control circuitry thereon, the monitor being position below said circuit board in its retracted position with its LCD screen facing said circuit board.

12. The retractable LCD of claim 11, wherein said monitor is approximately 5.4 cm thick and said housing is approximately 7.9 cm thick, with said monitor including said LCD screen on one side and a back surface on an opposite side from said LCD screen, said back surface being substantially flush with said exterior housing wall with the monitor in its retracted position.

13. The retractable LCD of claim 1, said monitor including a back surface on an opposite side of the monitor from said screen, a linkage receiver on the screen side of the monitor at the monitor's upper end in its open position, and a pivot coupling located towards the monitor's upper end closer to its back surface than to its screen, and further comprising a pivot coupling on said housing engaging the pivot coupling on said monitor, said mechanical coupling comprising a compound linkage connected between said motor and said monitor linkage receiver for pivoting said monitor about said pivot couplings.

14. A retractable liquid crystal display (LCD), comprising:

a housing having an exterior wall with an opening for an LCD monitor, an LCD monitor pivotally mounted to said housing for pivoting through an arc exceeding 90° between an open position at which the monitor extends out from the housing, and a retracted position at which the monitor is lodged in said opening, said monitor including an LCD viewing screen that is exposed for viewing in said open monitor position, faces the interior of said housing and is shielded by the remainder of said monitor in said retracted monitor position, a back surface on an opposite side of the monitor from said screen, a linkage receiver on the screen side of the monitor at the monitor's upper end in its open position, and a pivot coupling located towards the monitor's upper end closer to its back surface than to its screen, a motor mounted to said housing, a pivot coupling on said housing engaging the pivot coupling on said monitor, a compound linkage connected between said motor and said monitor linkage receiver for pivoting said monitor about said pivot couplings to its open position when actuated by said motor, and a return actuator for returning said monitor to its retracted position.

15. The retractable LCD of claim 14, said compound linkage causing said motor to be operated as a generator during the retraction of said monitor, said motor resisting the retraction of said monitor and slowing its retraction rate.

16. The retractable LCD of claim 15, said motor comprising a rotary electrical motor that develops a back-emf (electromotive force) to slow the retraction of said monitor.

17. The retractable LCD of claim 15, said return actuator comprising a spring mechanism, wherein said motor is coupled to said spring mechanism to flex the spring mechanism and cause it to store potential energy when the motor pivots the monitor to its open position.

18. The retractable LCD of claim 15, further comprising an electromagnetic brake for retaining said monitor in its open position.

\* \* \* \* \*